Figure 1:
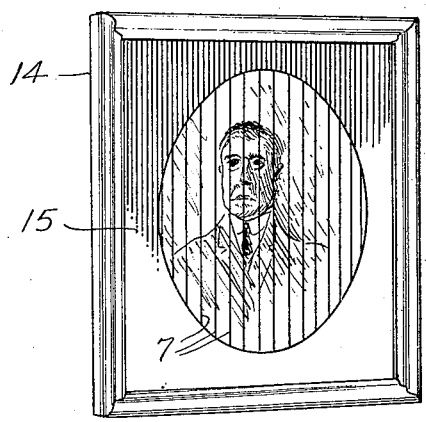

H. SIMON.
FRAME FOR A PLURALITY OF PICTURES.
APPLICATION FILED MAY 12, 1920.

1,353,363.

Patented Sept. 21, 1920.
2 SHEETS—SHEET 1.

Inventor
HENRY SIMON,
By Watson E. Coleman
Attorney

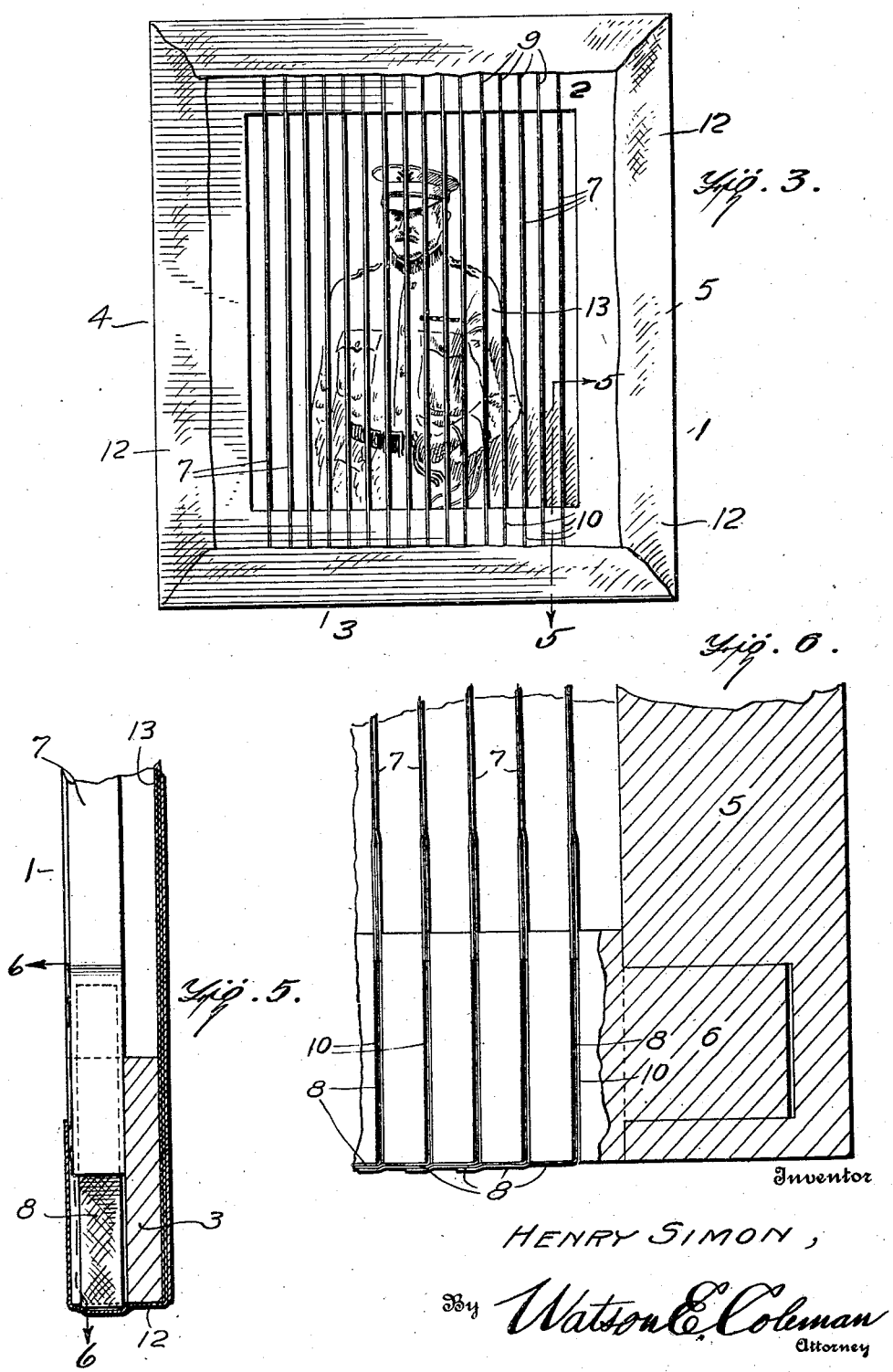

UNITED STATES PATENT OFFICE.

HENRY SIMON, OF FILER, IDAHO.

FRAME FOR A PLURALITY OF PICTURES.

1,353,363.        Specification of Letters Patent.        Patented Sept. 21, 1920.

Application filed May 12, 1920. Serial No. 380,903.

*To all whom it may concern:*

Be it known that I, HENRY SIMON, a citizen of the United States, residing at Filer, in the county of Twin Falls and State of Idaho, have invented certain new and useful Improvements in Frames for a Plurality of Pictures, of which the following is a specification, reference being had to the accompanying drawings.

This invention relates to an improved construction of frame for framing a plurality of pictures or photographs or the like, and an object is to provide a device of this character whereby each of the pictures is clearly visible, one capable of being seen on a plane substantially directly at right angles to the frame, another capable of being observed on a plane at an angle from the frame, say for instance on the left, and another to be observed on a plane at an angle to the right of the frame, in each case the picture or photograph being clearly visible in every detail.

Another object resides in the provision of a supporting frame of any suitable inexpensive material or wood, preferably white pine or the like, certain sides of the frame being slitted at spaced intervals, the slits of one side being in alinement with the slits of the opposite side for the reception of the strips having portions of the photograph or picture thereon, whereby upon viewing the frame from the left, one picture is visible and by viewing the frame from the right, another picture or photograph is visible.

Still another object embodies means for fastening the strips of the picture or photograph in the slits of the frame, said means acting to hold the strips taut, and owing to the slits being in alinement, the strips of the picture or photograph will be held straight.

A further object consists in the provision of a third picture secured to the back of the frame so that it is visible between the strips of the other pictures or photographs.

A still further object is to provide means to overlie the attachment means of the stripped photographs or pictures, to protect said securing or holding means.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 2:
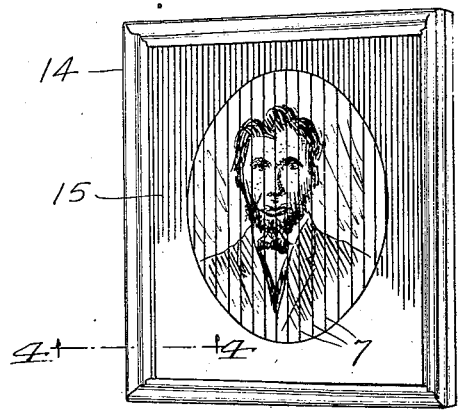
Figure 4:
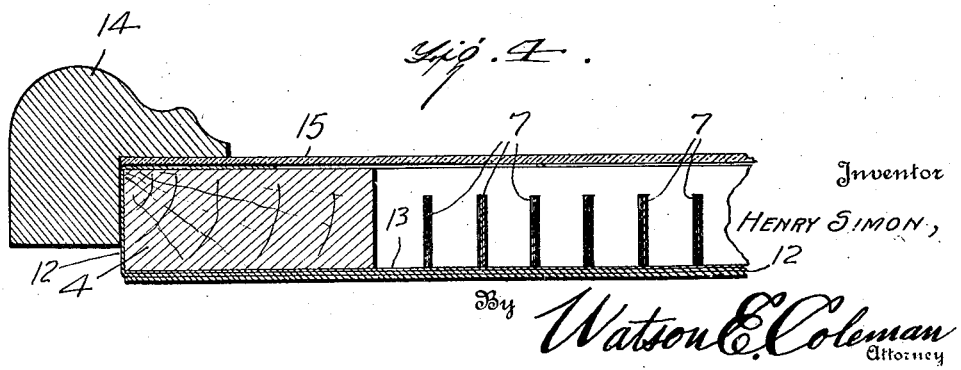

Figure 1 is a view in perspective of the improved frame showing a portrait looking at the picture on an angle from the left, Fig. 2 is a perspective view of the frame viewing the same on an angle from the right, showing an entirely different portrait, Fig. 3 is a view in elevation of the dominant frame removed or detached from the auxiliary frame 14, showing a third entirely different portrait, Fig. 4 is an enlarged detail sectional view on line 4—4 of Fig. 2 showing the slits of the dominant frame and illustrating the strips of the photograph engaging the plates, Fig. 5 is a sectional view on line 5—5 of Fig. 3 at right angles to that shown in Fig. 4; and Fig. 6 is an enlarged sectional view on line 6—6 of Fig. 5, showing how the tapes of the strips of the photograph are secured to the dominant frame.

Referring more especially to the drawings, 1 designates a dominant frame, which may be of any suitable configuration and proportion and constructed of any suitable inexpensive material, preferably white pine. This frame comprises the upper and lower pieces 2 and 3 and the side pieces 4 and 5 and the ends of these pieces are connected together at the corners of the frame by the usual mortise and tenon joints 6, as shown clearly in the drawings.

In order to mount or frame three distinct photographs in a single frame, certain two of the photographs are cut in equal number of elongated strips substantially half inch more or less, it depending upon the size of the photograph or picture, and the strips of each photograph are numbered from one upward, and the strip numbered 1 of one photograph or picture is pasted to the back of the numbered strips of the other photograph. For instance, should each photograph be cut in 22 strips of equal width, then the strip No. 1 of one photograph is pasted to the back of strip No. 22 of the other photograph, and strip No. 2 of the first photograph to strip No. 21 of the other photograph, and so on until all the strips are pasted back to back. In making the strips 7, tapes 8 are inserted between the end of the opposite pasted strips and adhesively secured. The ends of the strips are then placed in the ends of the slits, and the remaining portions of the tapes are protruded through the slits and extended beyond them, and have their extremities connected to the upper and lower edges of the frame pieces 2 and 3 adhesively. The slits or slots 9 and 10 are cut deep enough to receive the strips of photographs or pictures so that the edges of the strips will not protrude beyond the faces of the upper and lower pieces of the frame. The tapes also engage the slots or slits 9 and 10. A suitable fabric covering 12 is adhesively fastened to the frame over parts of the slits or slots and over the end parts of the tapes so as to protect the tapes and prevent them from becoming detached.

It will be observed that by viewing the frame from a plane at an angle to the left of the frame, a certain portrait is visible and by viewing the frame on a plane at an angle to the right, another portrait is visible. Furthermore, by viewing the frame or picture so as to have vision between the strips of the first two portraits, a third portrait 13 can be seen. This third photograph or picture is secured to the rear face of the frame 1 adhesively over the fabric covering, or may be tacked or otherwise detachably secured to the frame. The frame 1 with the portraits carried therein is fastened in the usual manner in an auxiliary frame 14.

The rear face of the glass 15 which is mounted in the auxiliary frame in front of the frame 1 is painted as shown, there being an unpainted portion of elliptical form or other shape so that the portraits and not the frame 1 are visible when viewing the frame as herein stated.

I claim:—

1. In a device for framing a plurality of pictures or photographs, a frame including opposed pieces provided with slits, the slits of one piece being in alinement with an opposite piece of the frame, a pair of photographs or pictures cut in equal number of strips, the consecutive strips of one picture beginning from the left being pasted to the backs of the consecutive strips of the other picture beginning from the right thereof, tapes carried by the pasted together strips and engaging said slits and being secured to the upper and lower edges of the opposite pieces of the frame.

2. In a device for framing a plurality of pictures or photographs, a frame including opposed pieces provided with slits, the slits of one piece being in alinement with an opposite piece, a pair of photographs or pictures cut in equal number of strips, the consecutive strips of one picture beginning from the left being pasted to the backs of the consecutive strips of the other photograph or picture beginning from the right thereof, tapes carried by the ends of the pasted together strips and engaging said slits and being secured to the upper and lower edges of the opposed pieces, and fabric means overlying the tapes and being adhesively secured to the frame for protecting the tapes and preventing their displacement.

3. In a device for framing a plurality of photographs, a frame including opposed pieces provided with alined slits, a pair of photographs or pictures cut in equal number of strips, the consecutive strips of one picture beginning from the left being pasted to the backs of the consecutive strips of the other photograph beginning from the right thereof, holding means secured between the end of the pasted together strips and also engaging the slots, said holding means being adhesively connected to the upper and lower pieces of the frame, fabric covering overlying said holding means which are adhesively connected to the upper and lower pieces of the frame, an additional photograph or picture secured to the rear face of the frame, whereby the photograph or picture is visible between the strips of the first photographs or pictures, an auxiliary frame in which said dominant frame is mounted, and a colored glass engaging the auxiliary frame and overlying the photographs.

4. A frame for a plurality of pictures or photographs provided with upper and lower pieces having slots or slits, the slots of the upper piece being in alinement with those of the lower piece, a pair of photographs cut in an equal number of strips, the consecutive strips of one picture beginning from the left being pasted to the backs of the consecutive strips of the other photograph beginning from the right thereof, said pasted together strips being engaged in said slits, tapes secured between the ends of the pasted together strips and passing through the slits and having their terminal portions overlapping each other and adhesively secured together and to the edge of the frame for holding taut the strips of the pictures or photograph and a fabric covering overlying the edge portions of the frame and over the terminals of the tapes for protecting the same.

In testimony whereof I hereunto affix my signature.

HENRY SIMON.